United States Patent [19]
Yoshimura et al.

[11] Patent Number: 5,249,052
[45] Date of Patent: Sep. 28, 1993

[54] IMAGE DISPLAY SYSTEM WITH COMPRESSED VIDEO SIGNAL RECORDING AND DISPLAY

[75] Inventors: Katsuji Yoshimura; Masahide Hasegawa; Kenichi Nagasawa; Koji Takahashi, all of Kanagawa, Japan

[73] Assignee: Canon Kabushiki Kaisha, Tokyo, Japan

[21] Appl. No.: 978,044

[22] Filed: Nov. 18, 1992

Related U.S. Application Data

[63] Continuation of Ser. No. 671,662, Mar. 19, 1991, abandoned, which is a continuation of Ser. No. 151,410, Feb. 2, 1988, abandoned.

[51] Int. Cl.$^5$ .......................................... H04N 5/782
[52] U.S. Cl. ..................................... 358/335; 358/330; 358/343; 358/140; 358/148; 358/906; 360/9.1; 360/19.1; 360/35.1
[58] Field of Search ................ 358/330, 335, 341, 343, 358/140, 148, 158, 188, 241, 242, 906; 360/9.1, 19.1, 35.1

[56] References Cited

U.S. PATENT DOCUMENTS

| | | | |
|---|---|---|---|
| 4,144,544 | 3/1979 | Fernsler | 358/158 |
| 4,216,396 | 8/1980 | Balaban et al. | 358/158 X |
| 4,240,111 | 12/1980 | Meise | 358/158 X |
| 4,510,538 | 4/1985 | Sato et al. | 360/9.1 X |
| 4,555,735 | 11/1985 | Usuki et al. | 358/906 X |
| 4,604,668 | 8/1986 | Lemelson | 358/906 X |
| 4,609,947 | 9/1986 | Yamagiwa et al. | 358/906 X |
| 4,651,209 | 3/1987 | Okada et al. | 358/158 X |
| 4,670,796 | 6/1987 | Kobayashi et al. | 360/19.1 X |
| 4,679,091 | 7/1987 | Kikuchi et al. | 358/342 |
| 4,682,245 | 7/1987 | Shibata et al. | 360/19.1 X |
| 4,766,355 | 8/1988 | Kadlec et al. | 358/242 X |
| 4,792,862 | 12/1988 | Tsusue et al. | 358/330 |

FOREIGN PATENT DOCUMENTS 60-19372 1/1985 Japan.
62-031861 2/1987 Japan.
62-255061 10/1987 Japan.
62-255981 10/1987 Japan.

Primary Examiner—W. R. Young
Attorney, Agent, or Firm—Robin, Blecker, Daley & Driscoll

[57] ABSTRACT

A system comprises a video camera for producing one field portion of a video signal in a second predetermined period during a first predetermined period which is longer than the second predetermined period, a recorder for recording the one field portion of the video signal from the video camera in the second predetermined period during the first predetermined period and a display device arranged to make a vertical scanning from the upper to the lower side of an effective display surface in the second predetermined period during the first predetermined period for displaying an image related to the video signal produced from the video camera.

19 Claims, 8 Drawing Sheets

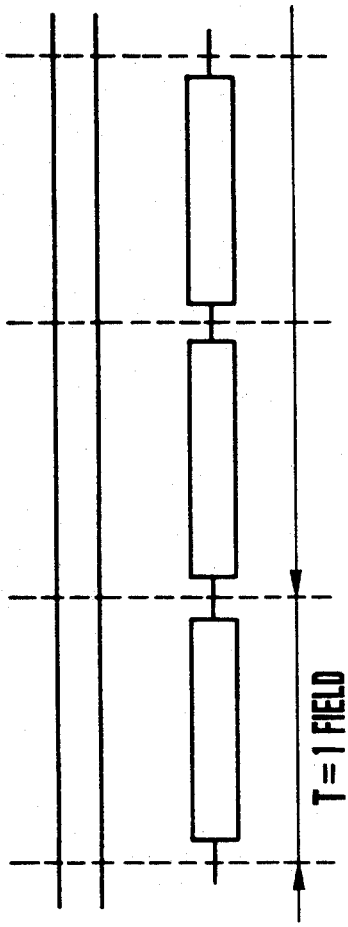
FIG.4(a) PRIOR ART
FIG.4(b) PRIOR ART
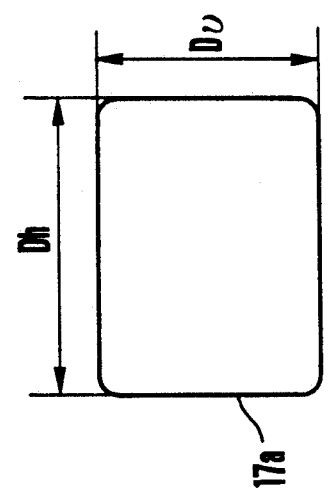
FIG.6

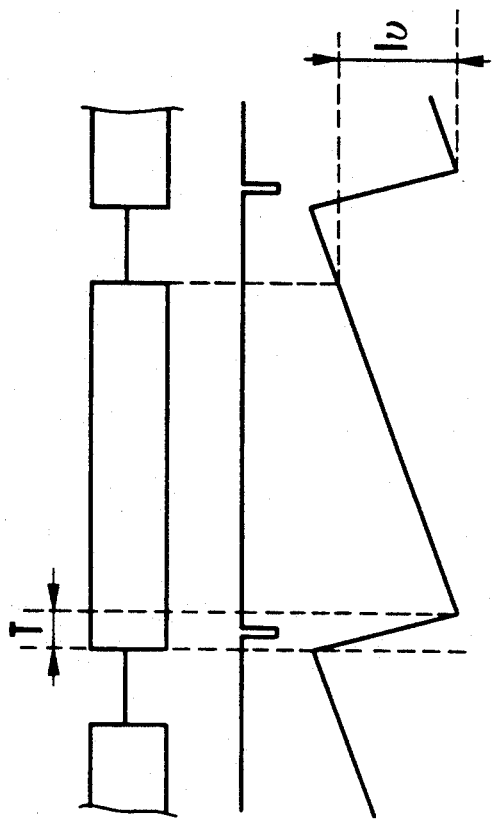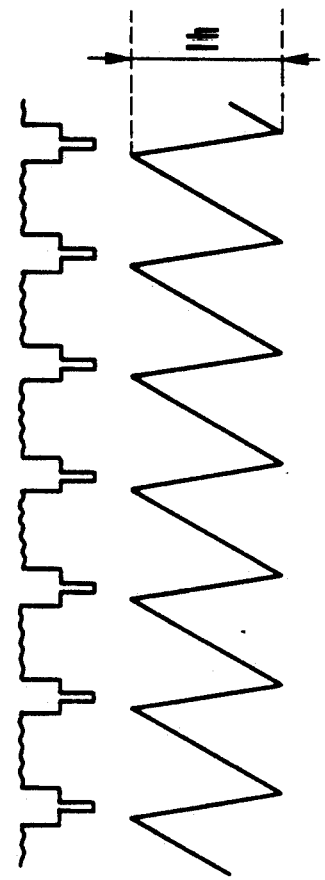
FIG.7(a)
FIG.7(b)
FIG.7(c)
FIG.8(a)
FIG.8(b)

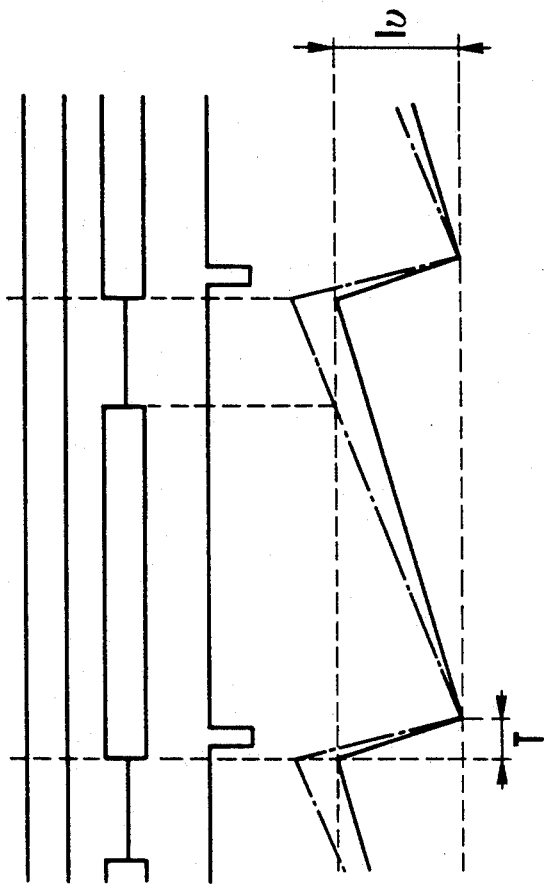
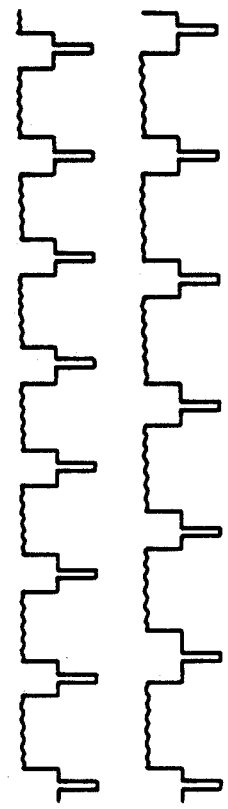
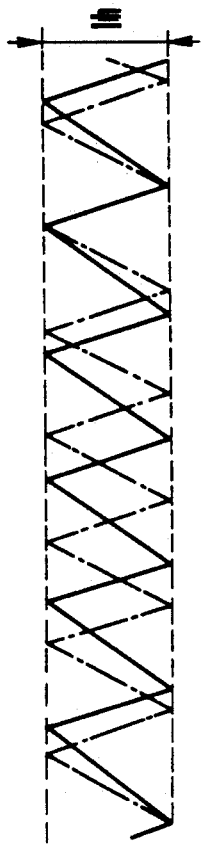
FIG.12(a) FIG.12(a') FIG.12(b) FIG.12(c) FIG.13(a) FIG.13(a') FIG.13(b)

IMAGE DISPLAY SYSTEM WITH COMPRESSED VIDEO SIGNAL RECORDING AND DISPLAY

This is a continuation application under 37 CFR 1.62 of prior application Ser. No. 671,662, filed Mar. 19, 1991, now abandoned, which is a continuation application under 37 CFR 1.62 of prior application Ser. No. 151,410, filed Feb. 2, 1988, now abandoned.

BACKGROUND OF THE INVENTION

1. Field of the Invention

This invention relates to image display systems and, more particularly, to display systems for displaying a video signal intended to be recorded on a recording medium, or a video signal reproduced from the recording medium.

2. Description of the Related Art

In the following written specification, taking an example of the home video tape recorder (VTR), this kind of system will be described below.

In general, the home VTRs have been known to be of the so-called rotary two-head helical scanning type. FIG. 1 is a diagram illustrating the head arrangement of this type VTR. In FIG. 1, a magnetic tape 1 is wound around the outer periphery of a rotary drum 3 over an angular distance of 180° or more by tape guides 2a and 2b.

Rotary heads HA and HB are mounted on the rotary drum 3 in phase difference of 180° from each other, and have different azimuth angles from each other. As is well known, for 180° rotation of the heads HA and HB, every one field of video signal is recorded or reproduced.

Since, in this kind of VTR, by the standard, the track length for one field of video signal is predetermined, leading to the necessity of taking the diameter of the rotary drum 3 at a certain value. From this reason, the drum diameter could not be reduced any more, hindering reduction of the size and weight of the VTR. Proposals, as described below, for a VTR capable of reducing the drum diameter have been made and put into practice. FIG. 2 is a diagram illustrating the head arrangement of the conventional VTR having the small-diameter drum. In the figure, Ha and Hb denote rotary heads of different azimuth angles from each other which rotate one revolution during the one-field period of video signal. The tape 1 is wound round the drum 4 to an angular range of more than 300° by tape guides 5a and 5b. The rotary heads Ha and Hb each rotate 300° when one field of video signal is recorded. In other words, the video signal for one field is caused to be recorded in a shorter period than that of the original one field of video signal.

Therefore, when the video signal to be recorded by this kind of VTR is assumed to be NTSC signal instead of the normal NTSC signal, that is, the signal whose vertical scanning frequency (fV) is 60 Hz and whose horizontal scanning frequency (fH) is 15.75 kHz, a one of 60 Hz in fV and $(15.75 \times (6/5)) \approx 18.9$ KHz in fH must be used.

In short, the video signal to be recorded by this kind of VTR must be what is obtained either by compressing the time axis of the normal television signal to 5/6 in each field, or from a specified camera therefor.

The specified camera has a picture frame (shown by dashed lines Y in FIG. 3) whose aspect ratio is 9:10. On scanning, that partial area which has an aspect ratio of 3:4 shown by solid lines X in FIG. 3 is taken as the effective picture frame to be produced within 5/6 of the field period, and to be recorded by the heads Ha and Hb.

The timing of this recording is explained by the timing charts of FIGS. 4(a) and 4(b). In the figures, in the period denoted by T, the video camera scans the picture frame Y of the aspect ratio 9:10 to obtain a video signal consisting of continued 315 horizontal scanning lines as shown in FIG. 4(a).

However, the time during the head Ha or Hb actually traces on the tape 1 accounts for 5/6 of the period in each field. Out of the 315 lines, therefore, 262.5 horizontal scanning lines are taken out as shown in FIG. 4(b) and recorded as the video signal of aspect ratio 3:4 on the magnetic tape. At this time, the heads Ha and Hb alternately trace on the magnetic tape. Hence it is possible for the VTR of such a head arrangement as shown in FIG. 2 to perform a similar recording to that in the VTR of the head arrangement shown in FIG. 1. Yet, because there is need to give a slight phase difference between the heads Ha and Hb, either the first field or the second of video signal must properly be delayed.

The use of such a head arrangement as shown in FIG. 2 in combination with such a method for recording the video signal as described above makes it possible to reduce the drum diameter to 3/5 of that of the VTR of FIG. 1.

By the way, in the VTR having such a head arrangement as shown in FIG. 2, when the recorded video signal is reproduced, absence of that reproduced video signal occurs for 1/6 of the period in every one revolution of the head. Also, since the horizontal scanning frequency fH is different from that of the normal television signal, it cannot be displayed on the television set or the like as it is.

So, an arrangement which enables the video signal to be reproduced by using a variable delay line is disclosed in Japanese Laid-Open Patent Application No. Sho 60-19372. In the VTR disclosed by that publication, the reproduced video signal obtained in a 5/6-field period out of the one-field period (having such a reproduced RF waveform as shown in FIG. 4(b)) is expanded in the time axis by using the variable delay line to get a continuous reproduced video signal.

Also, a so-called field memory may be used for similarly expanding the time axis to 6/5 with the video signal for one-field period, as disclosed in U.S. patent application Ser. No. 034,838 filed (Apr. 6, 1987), now U.S. Pat. No. 4,870,509.

However, in the case when such techniques as described above are used for displaying the reproduced video signal, either the variable delay line of 0–1/6 field periods or a memory capable of storing one field of video signal is necessary, and further a control circuit for these becomes necessary. Therefore, the reproducing function could not be cheaply added to the VTR having the drum of such a small diameter as shown in FIG. 2.

Also, because the reproduced video signal is produced once through the variable delay line or the field memory, deterioration of the signal arises thereby negatively influencing the image to be displayed.

Also, in the video recorder of the one-body type with camera, a smaller size and a lighter weight are demanded. But, the provision of the control circuit using such a field memory as described above increases the scale of the apparatus, and, in the recorder of the one-body type with the camera having the electronic view finder, incorporation of the control circuit therein is not conducive to minimization of its size.

Also, in the case when the VTR having such an image receiver as described above in the unified form is used as portable, it is desired to add even a capability of receiving and displaying the television signal being broadcast.

SUMMARY OF THE INVENTION

An object of the present invention is to reduce the size and weight and the cost of the image display system for recording or reproducing video signals.

Another object of the present invention is to minimize the size of a video camera equipped with the electronic view finder.

Under such an object, according to the present invention, as its one embodiment, an image display system is proposed, comprising a video camera for producing a video signal of one field by each first predetermined period in a second predetermined period which is shorter than the first predetermined period, a video recorder for recording the video signal produced from the camera on a recording medium and a display device having a display surface for displaying an image and arranged to display an image related to the video signal produced from the video camera, the display device being arranged to make the scanning period of the vertical direction from the upper side to the lower side of the display surface not longer than the second predetermined time.

Still another object of the invention is to provide a system capable of displaying as a good image the video signal reproduced by a reproducing device of a smaller size and a lighter weight.

Under such an object, according to the present invention, as its one embodiment, an image display system is proposed, comprising a reproducing device for reproducing from a recording medium a video signal of one field by each first predetermined period in a second predetermined period which is shorter than the first predetermined period, and a display device having a display surface for displaying an image and arranged to display an image related to the video signal reproduced from the reproducing device, the display device being arranged to make the scanning period of the vertical direction of of from the upper side to the lower side of the display surface not longer than the second predetermined period.

A further object of the present invention is to provide a system having a recording device of a smaller size or a reproducing device and a display device, wherein video signals to be recorded or the reproduced video signals also and the video signals inputted from the outside, too, can both be displayed, and the entirety of the system can be formed cheaply.

Under such an object, according to the present invention, as its one embodiment, an image display system is proposed, comprising a video camera for producing a video signal of one field by each first predetermined period in a second predetermined period which is shorter than the first predetermined period, input means for inputting a video signal including one field for each above first predetermined period and being continued, selecting means for selectively outputting the video signal produced from the video camera and the video signal input by the input means, and a display device having a display surface for displaying an image related to an output signal of the selecting means, the display device being arranged to change over the scanning speed of the vertical direction of the display surface in response to a selecting operation of the selecting means.

Other objects than those described above of the invention and its features will become apparent from the following detailed description of embodiments of the invention by reference to the drawings.

BRIEF DESCRIPTION OF THE DRAWINGS

FIGS. 4(a) and 4(b) are timing charts of the recording time in the VTR of the head arrangement of FIG. 2.

FIG. 6 is a plan view schematically illustrating the display surface in the system of FIG. 5.

FIGS. 7(a)-7(c) are timing charts illustrating the vertical deflection operation in the system of FIG. 5.

FIGS. 8(a) and 8(b) are timing charts illustrating the horizontal deflection operation in the system of FIG. 5.

FIGS. 12(a), 12(a'), 12(b), 12(c) are timing charts illustrating the vertical deflection operation in the system of FIG. 11.

FIGS. 13(a), 13(a'), 13(b) are timing charts illustrating the horizontal deflection operation in the system of FIG. 11.

DETAILED DESCRIPTION OF THE PREFERRED EMBODIMENTS

Figure 2:
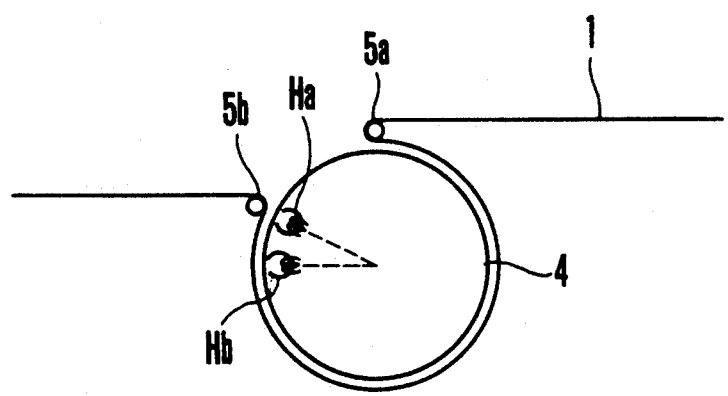
FIG. 2 is a diagram illustrating the head arrangement in the conventional VTR having the rotary head drum of reduced diameter.
Figure 3:
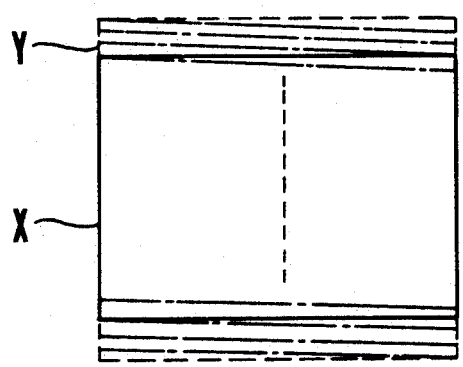
FIG. 3 is a diagram for explaining the scanning of the video camera exclusively used in the VTR of the head arrangement of FIG. 2.

The present invention is next described in the following embodiments including the VTR having such a head arrangement as shown in FIG. 2.

Figure 5:
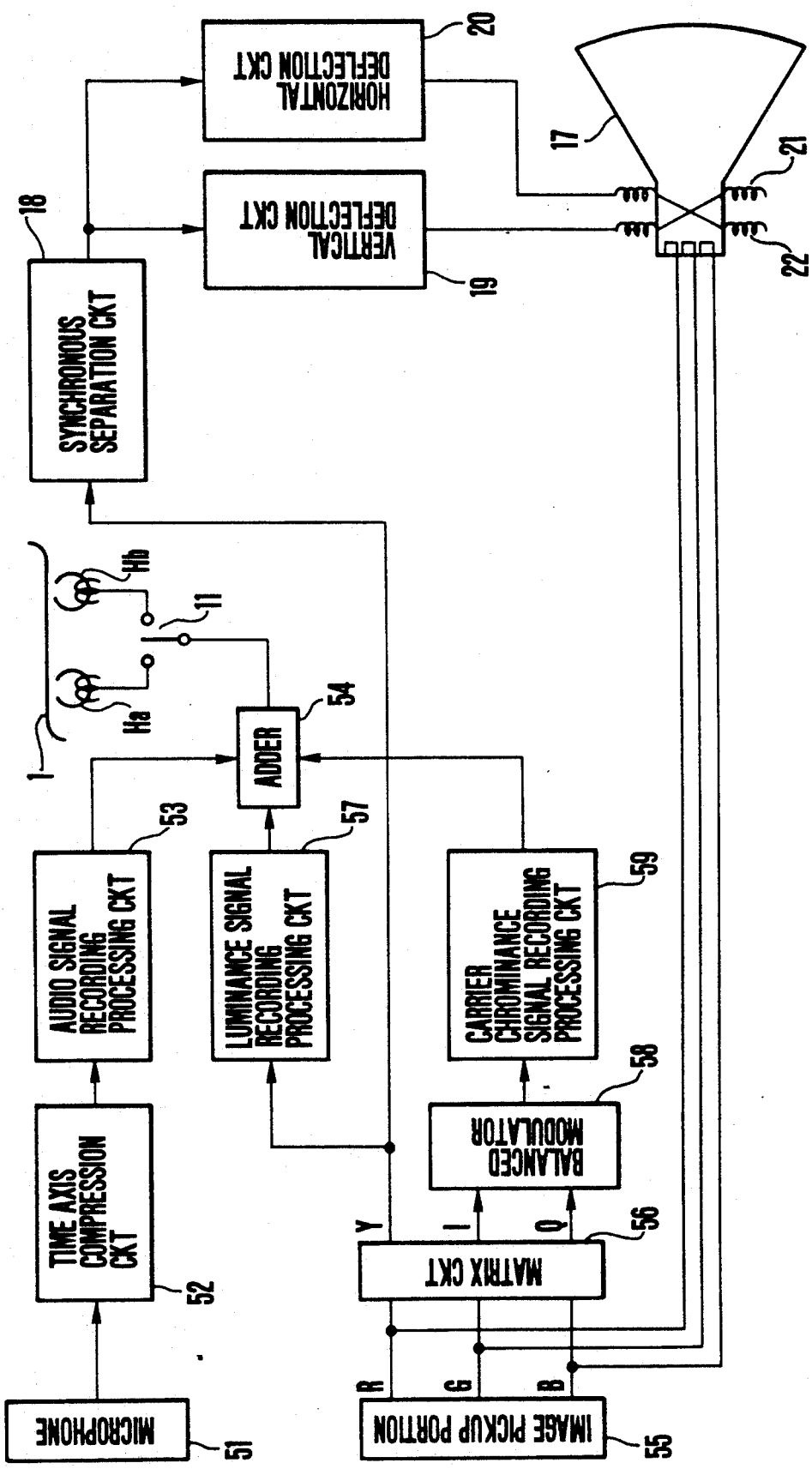
FIG. 5 is a diagram illustrating the structure of an embodiment of a system according to the invention.

FIG. 5 is a block diagram illustrating the structure of the main parts of an image recording system as one embodiment of the present invention, 1 is a magnetic tape, and Ha and Hb are rotary heads arranged likewise as in FIG. 2.

An audio signal obtained from a microphone 51 is supplied to a time axis compression circuit 52 where the time axis is compressed to 5/6 in units of one field. This time axis compression circuit 52 can easily be realized by using a memory capable of storing, for example, an audio signal of one field period and by setting its reading speed to 6/5 times the writing speed.

Figure 1:
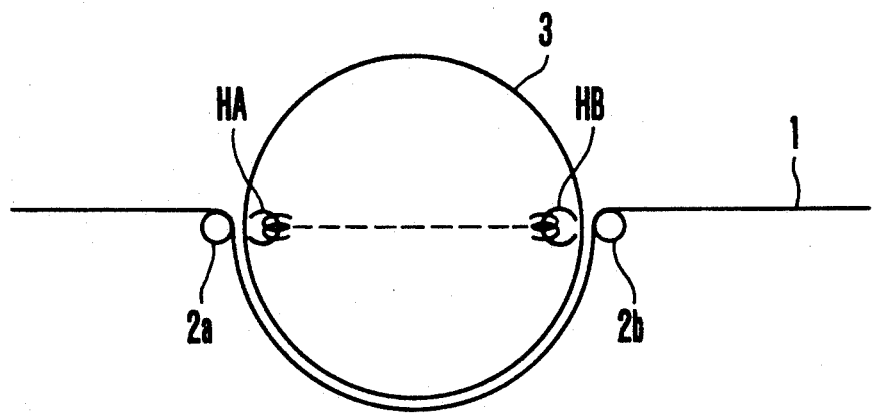
FIG. 1 is a diagram illustrating the head arrangement of the VTR of the rotary 2-head helical scanning type.

The audio signal produced from the time axis compression circuit 52 is subjected to known treatments such as FM modulation and pre-emphasis in an audio signal recording processing circuit 53 and then supplied to an adder 54. For note, the working frequency in the processing circuit 53 is 1.2 times as high as in the VTR having such a usual head arrangement as shown in FIG. 1.

An image pickup portion 55 scans a picture frame of an aspect ratio 9:10 with 315 horizontal scanning lines as has been described above and makes its effective picture area from 262.5 lines out of them, producing it in the form of R, G and B signals. These R, G and B signals are converted by a matrix circuit 56 to a luminance signal Y and two color difference signals I and Q. The luminance signal Y is applied to a luminance signal recording processing circuit 57 where it is subjected to FM-modulation or the like, and then supplied to the adder 54. The color difference signals I and Q are applied to a balanced modulator 58 where they are subjected to quadrature two-phase modulation by a carrier signal of low frequency so as to be arranged in a lower band than the band of the FM-modulated audio signal produced from the audio signal recording processing circuit 53. Thus, a carrier chrominance signal is obtained. This carrier chrominance signal is supplied to the adder 54 through a carrier chrominance signal recording processing circuit 59 which performs ACC, side-band emphasis and other treatments.

By the adder 54, the FM-modulated luminance signal, the low-band converted carrier chrominance signal and the FM-modulated audio signal are mixed to form a signal which is applied through a switch 11 to the heads Ha and Hb when being recorded on the magnetic tape 1. It will be appreciated that the pattern recorded in such a manner becomes similar to the pattern obtained by the conventional VTR having the head arrangement shown in FIG. 1.

The R, G and B signals obtained from the image pickup portion 55 are supplied to a video tube 17. Also, a synchronous separation circuit 18 is supplied with the luminance signal which has been given synchronism in the matrix circuit 56, to control the timing of deflection of vertical and horizontal deflection circuits 19 and 20 of the rear stage.

FIGS. 7(a)–7(c) are diagrams for explaining the operation of the vertical deflection circuit 19, and FIGS. 8(a) and 8(b) are diagrams for explaining the operation of the horizontal deflection circuit 20. FIG. 6 schematically shows a display surface 17a of the video tube 17.

As is well known, the vertical deflection circuit 19 and the horizontal deflection circuit 20 supply sawtooth currents to respective deflecting coils 21 and 22. For note, in the deflection circuits of this system, its deflecting speed or the scanning speed on the image plane is made 1.2 times as fast as in the picture receiver to be supplied with the usual video signal.

FIG. 7(a) shows an envelope waveform of the video signal produced from the image pickup portion 55. FIG. 7(b) shows a vertical synchronizing signal, and FIG. 7(c) shows the vertical deflection current to be applied to the vertical deflecting coil 21, where the gradient of this vertical deflection current is 1.2 times as steep as in the usual picture receiver except for a vertical retrace line period T, and the difference of the deflection current during the time when the effective image area is displayed (represented by $I\nu$ in the figure) is determined so as to give the electron beam more deflection than the distance $D\nu$ from the upper side to the lower side of the display surface 17a of FIG. 6.

FIG. 8(a) schematically shows the video signal produced from the image pickup portion 55, and FIG. 8(b) shows the horizontal deflection current supplied to the horizontal deflecting coil 22. The gradient of this horizontal deflection current also is 1.2 times as steep as in the usual picture receiver. Here, because the horizontal scanning period is 5/6 of that of the usual video signal, the difference Ih between the maximum and minimum values of the horizontal deflection current is the same as in the usual image receiver, and is determined so as to give the electron beam more deflection than the distance Dh between the right and left sides of the display surface 17a.

In such a manner, the image related to the video signal produced from the image pickup portion 55 can be displayed over the entire area of the above-described display surface 17a.

According to the image pickup system of such a construction as described above, by using such a rotary head drum of reduced diameter as shown in FIG. 2 and without using a memory of large capacity etc., an electronic view finder can be installed.

For note, though, in the above-described embodiment, as the image display element of the video tube is used, it is also possible to use a liquid crystal display instead. For this case also, the scanning speeds in the horizontal and vertical directions have to be increased to 1.2 times as fast as usual so that the display surface can be scanned from the upper to the lower side in a shorter period than that for 5/6 of the field in which the reproduced signal is present.

Figure 9:
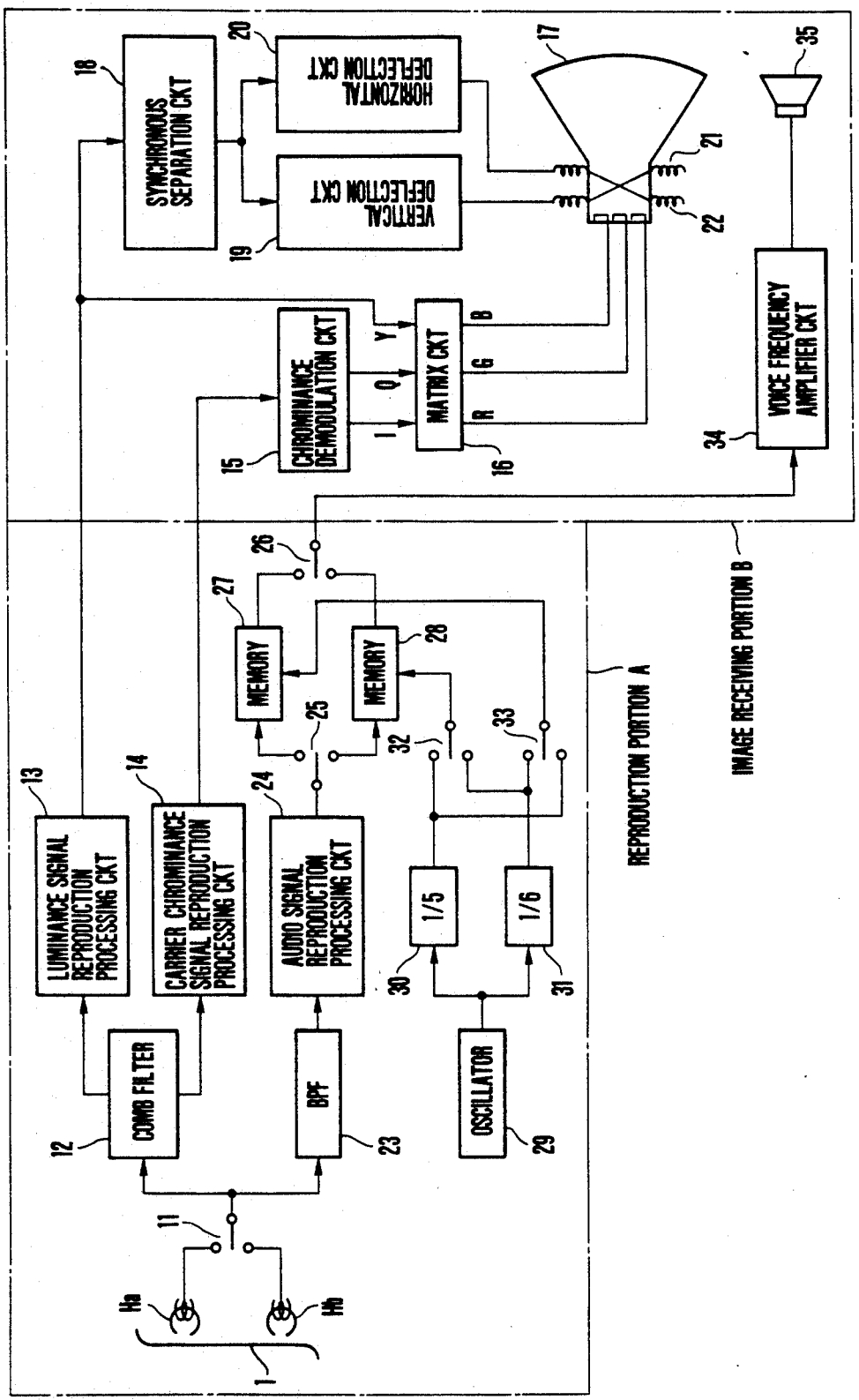
FIG. 9 is a diagram illustrating the structure of another embodiment of the system according to the invention.

FIG. 9 is a block diagram illustrating the outline of the structure of the essential parts of another embodiment of the image display system according to the present invention, wherein the similar constituent parts to those of FIG. 5 are denoted by the same numerals. 1 is a magnetic tape Ha and Hb are rotary heads arranged similarly to the system of FIG. 5. For note, in this example, it is assumed that the helical tracks on the tape 1 each have one field of video signal consisting of the FM-modulated luminance signal and the carrier chrominance signal converted to its low band, and one field of FM-modulated audio signal in a band between the above-described FM-modulated luminance signal and low-band converted carrier chrominance signal, recorded in frequency-multiplexed relation.

A head changeover switch 11 is changed over by a head switch pulse (not shown) each time the head Ha or Hb rotates one revolution, so that the signal which the head Ha or Hb has reproduced is outputted alternately in each revolution. The output of this switch 11 is shown in FIG. 7(a) where the output is present in only a period of 5/6 field out of one field, and its frequency is 1:2 times that of the signal reproduced by the VTR of such a head arrangement as shown in FIG. 1. A comb filter 12 separates the video signal included in the switch 11 to the FM-modulated luminance signal and low-band converted carrier chrominance signal, and supplies these to a luminance signal reproduction processing circuit 13 and a carrier chrominance signal reproduction processing circuit 14.

The luminance signal reproduction processing circuit 13 applies known treatments such as FM demodulation, de-emphasis and AGC to obtain a base-band luminance signal (Y) to be applied to a matrix circuit 16 of an image receiving portion B. On the other hand, the carrier chrominance signal reproduction processing circuit 14 applies crosstalk removal between the adjacent tracks under the condition that the carrier remains in the low band of frequency, ACC and other known treatments, and its output is supplied to a chrominance demodulation circuit 15. The chrominance demodulation circuit 15 demodulates the carrier chrominance signal under the condition of the low-band carrier to obtain two color difference signals (I and Q) which are supplied along with the luminance signal Y to the matrix circuit 16. For note, it goes without saying that, up to this point in the process for the signals of each portion, the frequency is 1.2 times that of the conventional VTR having such a head arrangement as shown in FIG. 1.

The matrix circuit 16 produces three primary color signals (R, G and B) on the basis of the signals Y, I and Q, and these signals R, G and B are supplied to the video tube 17.

Concerning the reflection circuits 19 and 20 for this video tube 17, the difference is in a point that the luminance signal produced from the luminance signal reproduction processing circuit 13 is supplied to a synchronous separation circuit 18, but the circuit that follows the synchronous separation circuit 18 has a similar structure and operates in a similar manner. That is, the vertical deflection signal becomes such a signal as shown in FIG. 7(c) and the horizontal deflection signal as shown in FIG. 8(b). Therefore, similarly to the case of the system of FIG. 5, an image related to the reproduced video signal can be displayed over the entire area of the display surface 17a of the above-described video tube 17.

Next, the treatment of the reproduced audio signal in the system of this example is briefly explained. The FM-modulated audio signal included in the reproduced signal produced from the switch 11 is separated out by a band pass filter (BPF) 23. Then, in an audio signal reproduction processing circuit 24, treatments such as FM-demodulation and noise reduction are performed with a frequency equal to 1.2 times as high as in the usual VTR having such a head arrangement as shown in FIG. 1 to obtain an audio signal of such a state that the time axis is compressed to 5/6 in each field. This signal is converted back to the original audio signal by a time axis expansion circuit comprising switches 25 and 26 and memories 27 and 28. The switches 25 and 26 are changed over between the connections to the memory 27 side and the memory 28 side each time the heads Ha and Hb rotate one revolution. When the switch 25 is connected to the memory 27 side, the switch 26 is connected to the memory 28 side. When the switch 25 is connected to the memory 28 side, the switch 26 is connected to the memory 27 side. That is, when writing of signal is performed in one memory, reading of signal from the other memory is performed. The output clock of an oscillator 29 is divided in frequency by a 1/5 frequency divider 30 and a 1/6 frequency divider 31. The output clock of the 1/5 frequency divider 30 is utilized as the write clock, and the output clock of the 1/6 frequency divider 31 as the read clock. Again, the switches 32 and 33 are changed over in synchronism with the switches 25 and 26 so that the output clock of the 1/5 frequency divider 30 is supplied to that memory which the switch 25 is connected to, and the output clock of the 1/6 frequency divider 31 is supplied to that memory which the switch 26 is connected to.

Thus, from the switch 26, the reproduced audio signal is produced. After the voice component only has been amplified by a voice frequency amplifier circuit 34, it is supplied to a speaker 35.

According to the system of such a construction as described above, even in the case when such a rotary head drum of reduced diameter as shown in FIG. 2 is used, it is possible to obtain a good reproduced image on the video tube 17 without using a memory of large capacity and a time axis expansion circuit of large scale. Moreover, because no time axis expansion circuit exists in the process for the reproduced signal, there is no deterioration of the image quality due to the presence of this circuit. And, because the luminance signal and the carrier chrominance signal can be treated independently of each other, it has become possible to suppress the deterioration of the image quality in accompaniment with the mixing, separation and further frequency conversion to a minimum. For example, according to the above-described arrangement, a portable type VTR with a superminiature type monitor can be offered, and its image quality can be preserved well.

Figure 10:
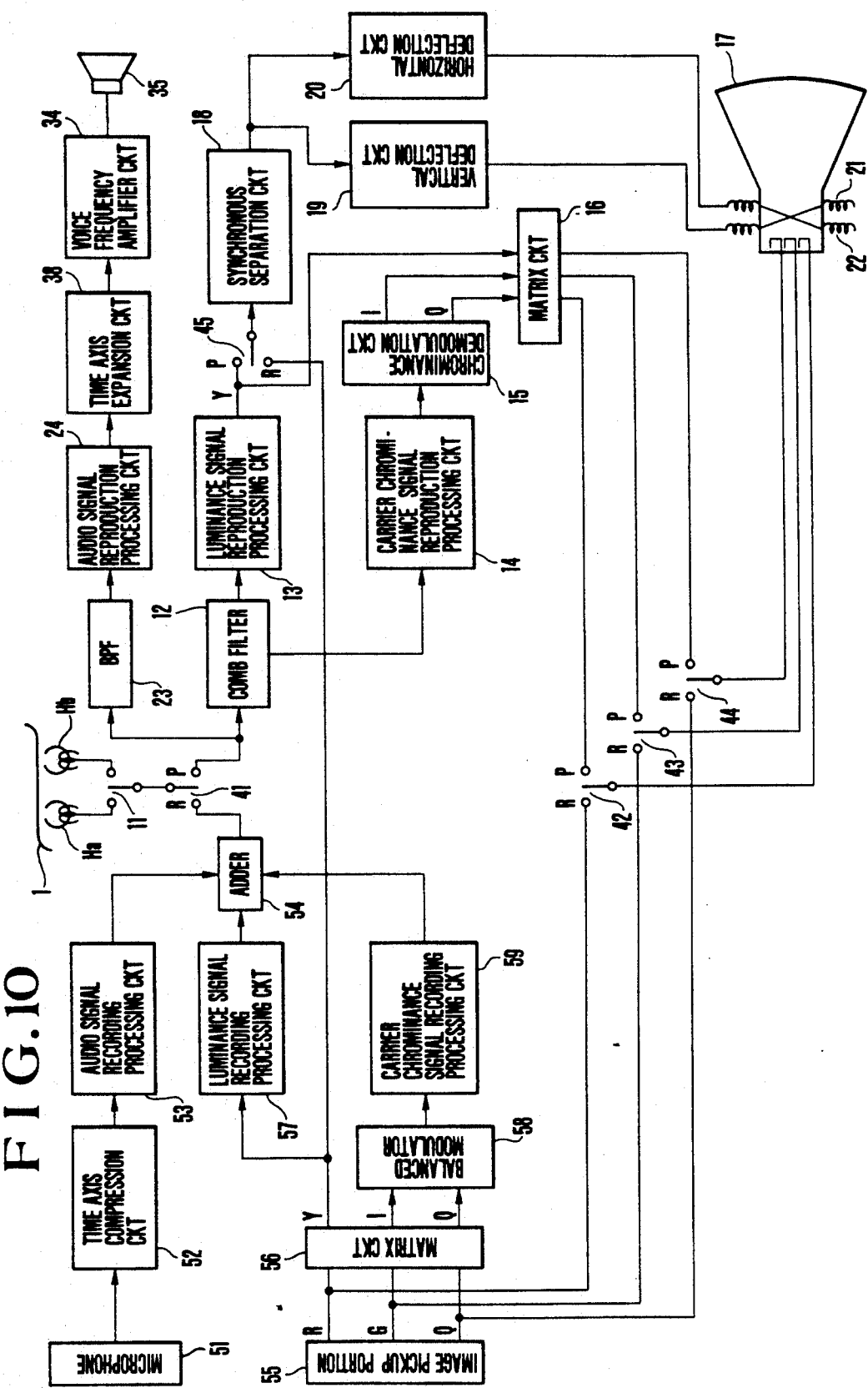
FIG. 10 is a diagram illustrating the structure of still another embodiment of the system according to the invention.

FIG. 10 is a diagram illustrating the outline of the structure of the main parts of another embodiment of the system according to the invention, where the similar constituent parts to those of FIG. 5 and FIG. 9 are denoted by the same numerals, and their explanation is omitted. 38 is a time axis expansion circuit including the switches 25 and 26 and memories 27 and 28 of FIG. 9.

Switches 41, 42, 43, 44 and 45 each is a record/reproduction changeover switch. The operation when these switches are connected to the record (R) side is similar to the system of FIG. 5, and when they are connected to the reproduction (P) side, is similar to the system of FIG. 9.

Figure 11:
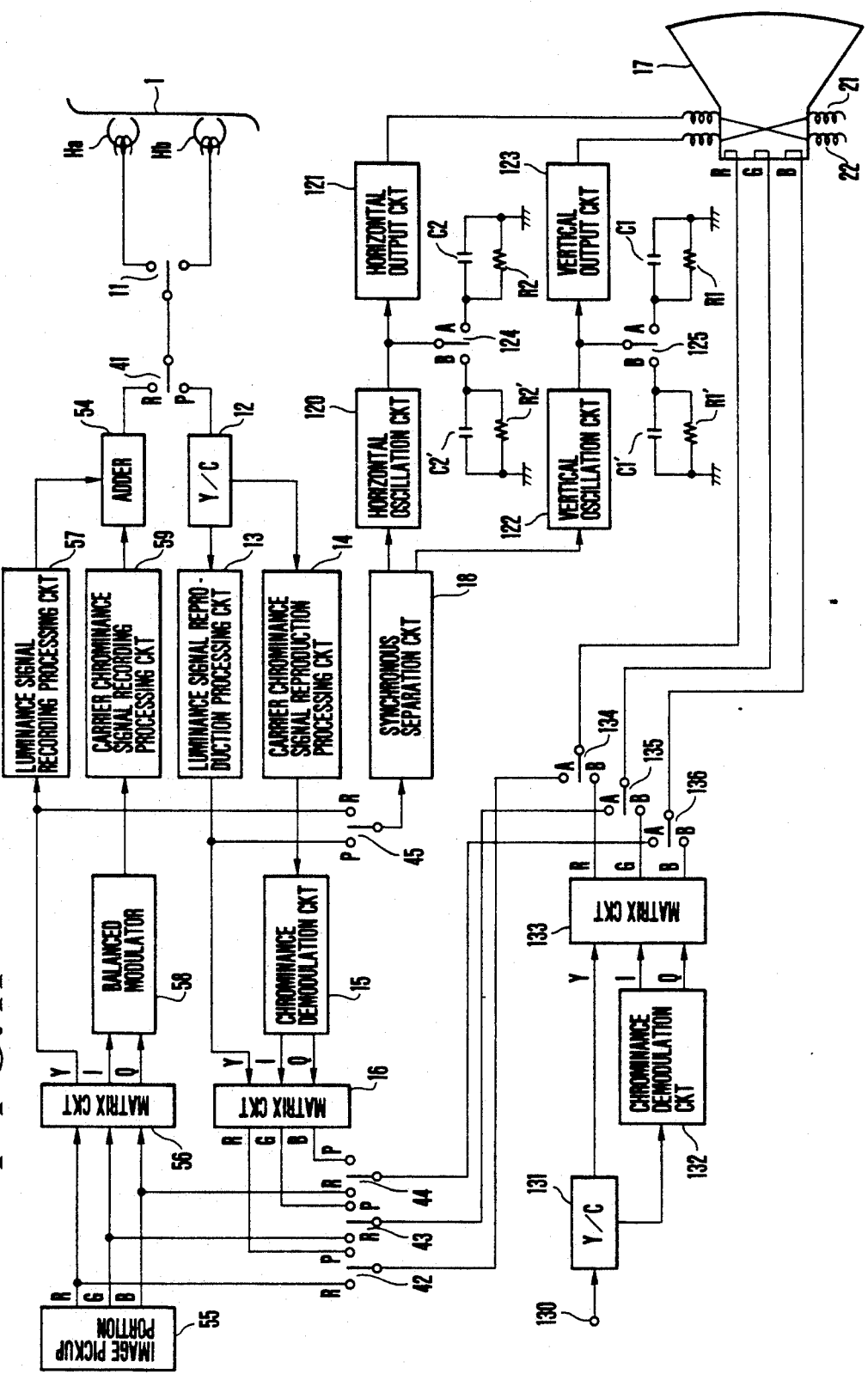
FIG. 11 is a diagram illustrating the structure of a further embodiment of the system according to the invention.

FIG. 11 is a diagram illustrating still another embodiment of the system according to the invention, wherein the similar constituent parts to those of FIG. 10 and their explanation is omitted. That is, regardless of whether the record/reproduction switches 41-45 are connected to the R side or the P side, the recording system circuit and the reproduction system circuit operate in a similar manner to that of the system of FIG. 10. Also, the signals produced from the switches 42, 43, 44 and the vertical and horizontal deflection signals at the time of recording or reproducing automatically become similar.

In the system of this embodiment, when the video signal obtained from the television tuner or the like is to be displayed, the operation is as follows. The composite video signal produced from the television tuner etc., is inputted to a terminal 130. In a Y/C separation circuit 131 using a comb filter or the like, the luminance signal and the carrier chrominance signal are obtained. This carrier chrominance signal is supplied to a chrominance demodulation circuit 132 to recover two kinds of color difference signals (I and Q). These color difference signals are applied along with the luminance signal to a matrix circuit 133 to make up the R, G and B signals. These R, G and B signals are supplied to the video tube 17 through the B sides of switches 134, 135, 136 except when recording or reproducing is carried out.

In this case, the video signal supplied to the video tube 17 is a signal without pauses as shown in FIG. 12(a), including information of one field in the one-field period (1/60 sec.). The gradient of the vertical deflection current (shown by the solid line in FIG. 12(c)) generated in the vertical deflection circuit becomes 5/6 of that of the case of displaying the signal to be recorded or the signal being reproduced. On the other hand, because the synchronism of the horizontal synchronizing signal is 1.2 times that of the case of displaying the signal to be recorded or the signal being reproduced, the horizontal deflection current becomes such as shown by the solid line in FIG. 13(b).

In such a manner, it is in the system of this embodiment that the gradients of the horizontal and vertical deflection currents are made to change between the case when the signal to be recorded or the signal being reproduced is displayed and the case when the video signal supplied from the tuner or the like is displayed.

The selecting operation of these gradients of the deflection current is described below. In the horizontal deflection circuit, a horizontal oscillation circuit 120 is supplied with the horizontal synchronizing signal separated by the synchronous separation circuit 18, and is grounded at its output side by using this horizontal synchronizing signal in each horizontal retrace line period. For the other period, a constant voltage is applied to the output side. Therefore, the gradient of the signal to be applied to a horizontal output circuit 121 is determined by the time constant of a circuit connected to the switch 124. Depending on which deflection current shown in FIG. 13(b) is desired, the switch 124 is properly connected to an A side or a B side, so that either one of the circuits of different time constants is selectively connected, thereby the above-described two kinds of deflection current can be formed by the horizontal output circuit 121.

Meanwhile, in the vertical deflection circuit, a vertical oscillation circuit 122 is supplied with the vertical synchronizing signal separated by the synchronous separation circuit 18, and, by utilizing this vertical synchronizing signal, is grounded at its output side in each vertical retrace line period. For the other period, a constant voltage is applied to the output side. Therefore, as the switch 125 is properly connected to an A side or a B side to selectively connect two kinds of circuits of different time constants, the above-described two kinds of vertical deflection current can be formed from a vertical output circuit 123.

According to such a system as described above, without using a variable delay line or a field memory, any of the signals to be recorded or being reproduced by the VTR of the head arrangement shown in FIG. 2, and the video signals inputted from other video sources such as the tuner can be displayed by one and the same video tube. Thanks to this, for example, a unified apparatus of the portable VTR and image receiver with the capability of displaying an image by the air check, or such a composite apparatus can be offered at a low price.

What is claimed is:

1. An image display system comprising:
   (a) a video camera for producing one field portion of a particular video signal in a second predetermined time period during a first predetermined time period which is longer than said second predetermined time period, a horizontal synchronizing period of the particular video signal being shorter than that of a normal video signal;
   (b) a video recorder for recording the particular video signal produced from said camera on a recording medium; and
   (c) a display device having an effective display surface for displaying an image and arranged to display an image related to the particular video signal produced from said video camera, said display device being arranged to make a vertical scanning from the upper end to the lower end of said effective display surface in said second predetermined time period during said first predetermined time period.

2. A system according to claim 1, wherein said recorder is arranged to record the particular video signal produced from said video camera on the recording medium so that one field portion of the particular video signal is recorded in said second predetermined time period during said first predetermined time period.

3. A system according to claim 2 wherein said recorder is arranged to record an audio signal on said recording medium so that an audio signal corresponding to said first predetermined time period is recorded in said second predetermined time period by compressing an audio signal.

4. A system according to claim 2, wherein said recorder includes reproducing means for reproducing the one field portion of the particular video signal from said recording medium in said second predetermined time period during said first predetermined time period.

5. A system according to claim 4, further comprising:
   switching means for selectively supplying the particular video signal produced from said video camera and the particular video signal reproduced by said reproducing means to said display device.

6. An image display system comprising:
   (a) a reproducing device for reproducing one field portion of a particular video signal from a recording medium in a second predetermined time period during a first predetermined time period which is longer than said second predetermined time period, a horizontal synchronizing period of the particular video signal being shorter than that of a normal video signal; and
   (b) a display device having an effective display surface for displaying an image and arranged to display an image related to the particular video signal reproduced by said reproducing device, said display device being arranged to make a scanning from the upper end to the lower end of said effective display surface in said second predetermined time period during said first predetermined time period.

7. A system according to claim 6, wherein said reproducing device is arranged to reproduce from a recording medium having a number of tracks formed thereon and each containing one field portion of video signal, and to reproduce one track of video signal in said second predetermined time period during said first predetermined time period.

8. A system according to claim 6, wherein said reproducing device includes means for reproducing an audio signal recorded on said recording medium and for expanding the time axis so that an audio signal reproduced in said second predetermined time period is reproduced during said first predetermined time period.

9. An image display system comprising:
   (a) a video camera for producing one field portion of a video signal in a second predetermined time period during a first predetermined time period which is longer than said second predetermined time period;
   (b) input means for inputting a video signal including one field portion in said first predetermined time period;
   (c) selecting means for selectively outputting the video signal produced from said video camera and the video signal input by said input means; and
   (d) a display device having an effective display surface for displaying an image related to an output signal of said selecting means, said display device being arranged to change over the vertical scanning speed of said effective display surface in response to a selecting operation of said selecting means.

10. A system according to claim 9, wherein said display device is arranged so that when said selecting means produces the video signal produced from said video camera, the scanning period of the vertical direction from the upper end to the lower end of said effective display surface is not longer than said second predetermined time period, and when said selecting means produces the video signal input by said input means, the scanning period of the vertical direction from the upper end to the lower end of said effective display surface is longer than said second predetermined time period.

11. A system according to claim 9, further comprising a video recorder for recording one field portion of the video signal produced from said video camera in said second predetermined time period during said first predetermined time period.

12. An image display device comprising:
(a) a reproducing device for reproducing one field portion of a video signal from a recording medium in a second predetermined time period during a first predetermined time period which is longer than said second predetermined time period;
(b) input means for inputting a video signal including one field portion in said first predetermined time period;
(c) selecting means for selectively outputting the video signal reproduced by said reproducing device and the video signal input by said input means; and
(d) a display device having an effective display surface for displaying an image related to an output signal of said selecting means, said display device being arranged to change over the vertical scanning speed of said effective display surface in response to a selecting operation of said selecting means.

13. A system according to claim 12, wherein said display device is arranged so that the scanning period of the vertical direction from the upper end to the lower end of said effective display surface when said selecting means produces the video signal reproduced by said reproducing means is set to be shorter than when said selecting means produces the video signal input by said input means.

14. A system according to claim 12, further comprising a video camera for producing one field portion of a video signal in said second predetermined time period during said first predetermined time period.

15. A system according to claim 14, wherein said selecting means includes first switching means for selectively outputting the video signal produced by said video camera and the video signal reproduced by said reproducing means, and second switching means for selectively supplying the video signal output by said first switching means and the video signal input by said input means to said display device.

16. A system according to claim 15, wherein said display device is arranged to change over the scanning period of the vertical direction of said display surface in response to a selecting operation of said second switching means.

17. A system according to claim 14, wherein said reproducing device is arranged such that the video signal produced by said video camera is recordable on said recording medium.

18. A system according to claim 12, wherein said display device includes a vertical deflection circuit and a plurality of time constant circuits selectively connected to said vertical deflection circuit.

19. An image display device comprising:
(a) first input means for inputting one field portion of a video signal in a second predetermined time period during a first predetermined time period which is longer than said second predetermined time period;
(b) second input means for inputting one field portion of a video signal in a time period different from said second predetermined time period during said first predetermined period;
(c) selecting means for selectively outputting the video signal input by said first input means and the video signal input by said second input means; and
(d) a display device having an effective display surface for displaying an image related to an output signal of said selecting means, said display device being arranged to change over the vertical scanning speed of said effective display surface in response to a selecting operation of said selecting means.

* * * * *

UNITED STATES PATENT AND TRADEMARK OFFICE
CERTIFICATE OF CORRECTION

PATENT NO. : 5,249,052
DATED : September 28, 1993
INVENTOR(S) : Katsuji Yoshimura, et al.

It is certified that error appears in the above-indentified patent and that said Letters Patent is hereby corrected as shown below:

Title page, Item [30]. Insert -- [30] Foreign Application Priority Data

Feb. 14, 1987 [JP] Japan 62-031861
Oct. 08, 1987 [JP] Japan 62-255061
Oct. 09, 1987 [JP] Japan 62-255981 -- and

Foreign Pat. Doc. Delete 62-031861 2/1987 Japan
62-255061 10/1987 Japan
62-255981 10/1987 Japan Col. 1, line 38. Change "From" to -- For --
Col. 1, line 48. Change "round" to -- around --
Col. 2, line 11. After "during" insert -- which --
Col. 2, line 23. After "second" insert -- field -- and change "properly be" to -- be properly --
Col. 3, line 47. Delete "of of"
Col. 6, line 33. After "tape" insert -- . --

Signed and Sealed this

Seventeenth Day of May, 1994

Attest:

BRUCE LEHMAN

Attesting Officer     Commissioner of Patents and Trademarks